United States Patent [19]

Izukawa

[11] Patent Number: 4,658,172

[45] Date of Patent: Apr. 14, 1987

[54] DRIVE CIRCUIT FOR A VIBRATION WAVE MOTOR

[75] Inventor: Kazuhiro Izukawa, Yokohama, Japan

[73] Assignee: Canon Kabushiki Kaisha, Tokyo, Japan

[21] Appl. No.: 699,319

[22] Filed: Feb. 7, 1985

[30] Foreign Application Priority Data

Feb. 10, 1984 [JP] Japan .................................. 59-24023

[51] Int. Cl.$^4$ ............................................ H01L 41/08
[52] U.S. Cl. ...................................... 310/316; 310/323
[58] Field of Search ............... 310/316, 317, 323, 324, 310/325; 331/139

[56] References Cited

U.S. PATENT DOCUMENTS 3,588,690  6/1971  Griffin ............................. 331/139 X
4,504,760  3/1985  Yamamoto et al. ............. 310/317 X
4,510,411  4/1985  Hakamata et al. ................... 310/316

*Primary Examiner*—Patrick R. Salce
*Assistant Examiner*—Emanuel Todd Voeltz
*Attorney, Agent, or Firm*—Fitzpatrick, Cella, Harper & Scinto

[57] ABSTRACT

A drive circuit for stably driving a vibration wave motor at a resonance frequency of the motor.

12 Claims, 19 Drawing Figures

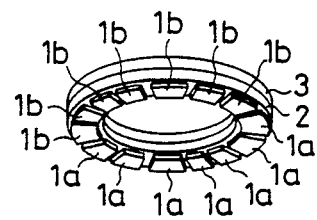
FIG. 1A
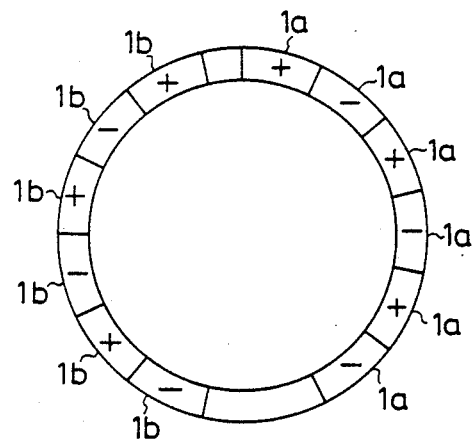
FIG. 1B
FIG. 2A
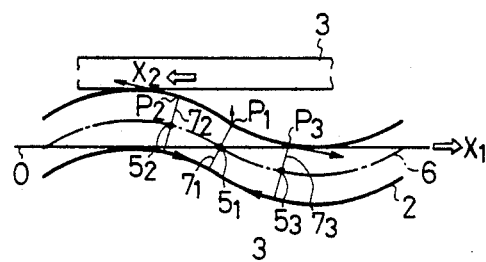
FIG. 2B
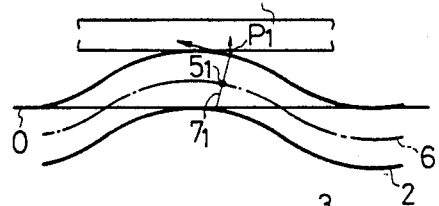
FIG. 2C
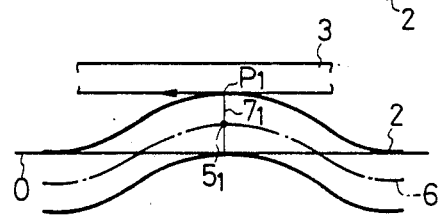
FIG. 2D
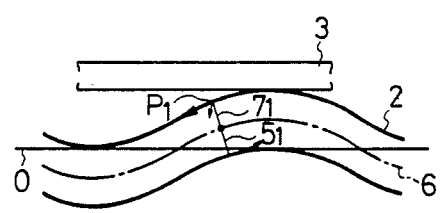

DRIVE CIRCUIT FOR A VIBRATION WAVE MOTOR

BACKGROUND OF THE INVENTION

1. Field of the Invention

The present invention relates to a drive circuit for a vibration wave motor which frictionally drives a movable member by a travelling vibration wave, and more particularly to a drive circuit for causing the wave to vibrate in a stable resonance state.

2. Description of the Prior Art

FIG. 1 shows a schematic view of a vibration wave motor driven by a travelling vibration wave, which motor has recently been put into practice. Numerals $1a$ and $1b$ denote electrostrictive devices which may be made of PZT (zirconium lead titonate) and numeral 2 denotes a vibration member which is made of an elastic material on which the electrostrictive devices $1a$ and $1b$ are bonded. The vibration member 2 as well as the electrostrictive devices $1a$ and $1b$ are held on a stator (not shown). Numeral 3 denotes a movable member which is press-contacted to the vibration member 2 to form a rotor. The electrostrictive devices $1a$ and $1b$ are bonded as shown in FIG. 1B and one group of electrostrictive devices $1a$ are displaced from the other group of electrostrictive devices $1b$ by one quarter of a wavelength $\lambda$ of the vibration wave. The electrostrictive devices $1a$ in the one group are arranged at a pitch of one half of the wavelength with adjacent ones being oppositely polarized. The electrostrictive devices $1b$ of the other group are also arranged at the pitch of one half of the wavelength with adjacent ones being oppositely polarized. Electrode films (not shown) are formed on front and back sides of the electrostrictive devices $1a$ and $1b$ so that A.C. voltages are applied to the electrostrictive devices $1a$ and $1b$.

In the vibration wave motor thus constructed, an A.C. voltage of $Vo \sin \omega T$ is applied to the one group of electrostrictive devices $1a$ and an A.C. voltage of $Vo \cos \omega T$ is applied to the other group of electrostrictive devices $1b$. Accordingly, the A.C. voltages having a phase difference of 90° are applied to the electrostrictive devices of the respective groups with adjacent ones being oppositely polarized. Thus, the electrostrictive element expands and shrinks. Since this vibration is propagated to the vibration member 2, it makes a bending vibration at a pitch of the arrangement of the electrostrictive devices $1a$ and $1b$. When the vibration member 2 projects at alternate electrostrictive device positions, it recedes at other alternate electrostrictive device positions. Since the electrostrictive devices $1a$ are displaced from the electroctrictive devices $1b$ by one quarter of the wavelength, the bending vibration travels. While the A.C. voltages are applied, the vibrations are sequentially excited and propagated through the vibration member 2 as a travelling bending vibration wave.

The travel of the wave is shown in FIGS. 2A, 2B, 2C and 2D. Assuming that the travelling bending vibration wave travels in a direction of an arrow $X_1$ and 0 denotes a center plane of the vibration member in a quiescent state, a vibration state is represented by a chain line. On a neutral plane 6, bending stresses are balanced. On a sectional plane $7_1$ which is normal to the neutral plane 6, no stress is applied to a crossing line $5_1$ of those two planes and it merely vibrates vertically. The sectional plane $7_1$ makes a lateral pendulum motion around the crossing line $5_1$. Similarly, sectional planes $7_2$ and $7_3$ make lateral pendulum motions around crossing lines $5_2$ and $5_3$, respectively.

In FIG. 2A, a point $P_1$ on a crossing line of the sectional plane $7_1$ and the surface of the vibration member 2 facing the movable member 3 is a right dead center of the lateral vibration and it makes only the vertical motion. When the crossing line $5_1$, $5_2$ or $5_3$ is on a positive side of the wave (above the center plane 0), a leftward (opposite to the travel direction $X_1$ of the wave) stress is applied, and when it is on a negative side of the wave (below the center plane 0), a rightward stress is applied. In FIG. 2A, the crossing line $5_2$ and the sectional plane $7_2$ indicate the former state and the stress in the direction shown by the arrow is applied to the point $P_2$. The crossing line $5_3$ and the sectional plane $7_3$ show the latter state and the stress in the direction shown by the arrow is applied to the point $P_3$. As the wave travels and the crossing line $5_1$ comes to the positive side of the wave as shown in FIG. 2B, the point $P_1$ makes the leftward motion and the vertical motion. In FIG. 2C, the point $P_1$ makes only the leftward motion at the top dead center of the vertical motion. In FIG. 2D, the point $P_1$ makes the leftward motion and the rightward motion. As the wave further travels, it makes the rightward and downward motion, the rightward and upward motion and returns to the state of FIG. 2A. Through those series of motions, the point $P_1$ makes a rotating elliptic motion. On the other hand, the movable member 3 is press-contacted to the vibration member 2, and the rotating elliptic motion of the point $P_1$ on the vibration member 2 frictionally drives the movable member 3 in the direction $X_2$. The points $P_2$ and $P_3$, and all other points on the vibration member 2 similarly frictionally drives the movable member 3.

The vibration wave motor is efficiently driven when the vibration is in a resonance state. The resonance frequency is determined by dimensions of the electrostrictive device and vibration member, the temperature and the contact pressure of the movable member.

When the electrostrictive resonator is driven, the resonance frequency of the resonator varies with a load. Accordingly, if the drive frequency is fixed, the resonator may not be vibrated in the resonance state. Therefore, in the prior art, a voltage proportional to a strength of the mechanical vibration of the resonator is fed back to an input terminal of an amplifier of the oscillator to change the oscillation frequency to follow the resonance frequency of the resonator.

However, it has not been known to adopt the above method in the vibration wave motor which drives the movable member by generating the travelling vibration wave. There are various problems in feeding the mechanical vibration of the resonator to the amplifier, such as the need for a complex circuit.

SUMMARY OR THE INVENTION

It is an object of the present invention to provide a drive circuit for a travelling vibration wave motor which drives an electrostrictive resonator.

It is another object of the present invention to provide a drive circuit for a vibration wave motor having an oscillation circuit which is simple in configuration, follows a change of an impedance of the resonator and has a high Q.

It is yet another object of the present invention to provide a suitable mount space of electrostrictive device used to pick up a voltage proportional to the strength of the mechanical vibration of the vibration wave motor.

It is a further object of the present invention to improve a drive effeciency by cutting a high frequency component of the drive circuit for the vibration wave motor by providing a filter in the drive circuit.

BRIEF DESCRIPTION OF THE DRAWINGS

FIG. 1 is a schematic view of major portions of a vibration wave motor,

FIG. 2 illustrates a principle of drive of the vibration wave motor,

DETAILED DESCRIPTION OF THE PREFERRED EMBODIMENTS

Figure 3:
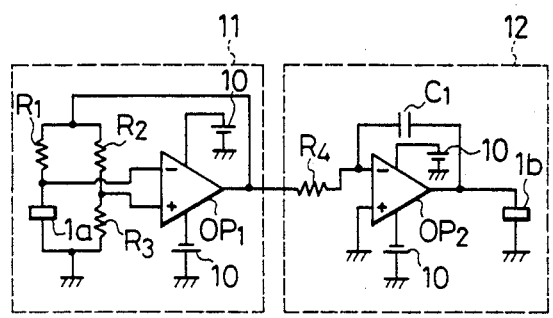
FIG. 3 is a circuit diagram of one embodiment of a drive circuit of the present invention.

FIG. 3 shows a drive circuit in accordance with the present invention. Numeral 10 denotes a voltage source, numeral 11 denotes an oscillator, numeral 12 denotes a 90° phase shifter, $OP_1$ and $OP_2$ denote operational amplifiers, $R_1$ to $R_4$ denote resistors, $C_1$ denotes a capacitor and numerals $1a$ and $1b$ denote electrostrictive devices.

The oscillator 11 comprising $R_1$ to $R_3$, $1a$ and $OP_1$ is usually called a Meacham circuit which is known as a circuit used with a crystal resonator having a high frequency stability.

In accordance with the present invention, the Meacham circuit is applied to the drive circuit for the vibration wave motor which is driven by the travelling vibration wave so that the drive circuit is implemented with a simple construction.

The operation of the oscillator 11 will now be explained. In the oscillator 11, a voltage V+ at a + input terminal of the operational amplifier $OP_1$ is given by $$V+ = \{R_3/(R_2+R_3)\}\cdot Vout \quad (1)$$

wherein Vout is an output voltage of the operational amplifier $OP_1$. Similarly, a voltage V− at a − input terminal of the operational amplifier $OP_1$ is given by $$V- = \{z/(z+R_1)\}\cdot Vout \quad (2)$$

where z is an impedance of the electrostrictive device $1a$.

Figure 4:
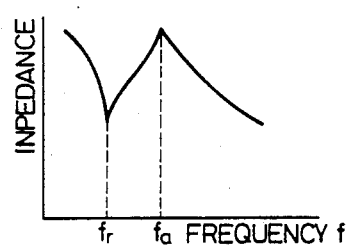
FIG. 4 shows a relation between a drive frequency of the vibration wave motor and an impedance of an electrostrictive device.

The impedance z of the electrostrictive device changes with a vibration frequency f. A frequency characteristic thereof is shown in FIG. 4, in which fr denotes a resonance frequency and fa denotes an anti-resonance frequency. By differentiating the formula (2) with the frequency f, we get $$\frac{dV-}{df} = \frac{dz}{df} \cdot \frac{R_1}{(z+R_1)^2} \quad (3)$$

accordingly, a voltage difference between the input terminal voltages, Vin=(V+)−(V−) increases and decreases with the frequency f as shown below.

| f | <fr | fr | fr< |
|---|---|---|---|
| dz/df | − |  | + |
| dv−/df | − |  | + |
| v− | decrease | $z/(z+R_1)$ | increase |
| Vin | increase | $\frac{R_3}{R_2+R_3} - \frac{z}{z+R_1}$ | decrease | as seen from the above table, the input voltage difference Vin is maximum at the resonance frequency fr of the electrostrictive device. Accordingly, the resistors $R_1$ to $R_3$ are selected to meet the above relation. The quality (Q) is given by Ao·Qo where Qo is the quality of the electrostrictive device and Ao is an amplification factor of the operational amplifier $OP_1$.

In the 90° phase shifter 12, the phase of the output voltage of the operational amplifier $OP_1$ is retarded by an integraton circuit comprising the operational amplifier $OP_2$, the resistor $R_4$ and the capacitor $C_1$ and the phase-retarded signal is applied to the electrostrictive device $1b$.

Figure 5:
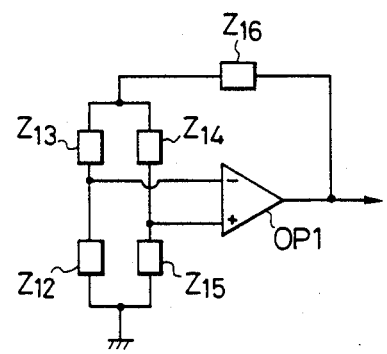
FIG. 5 shows a modification of the drive circuit shown in FIG. 4, FIGS. 6A, 6B and 6C show circuits to be inserted into the circuit blocks shown in FIG. 5.

FIG. 5 is a block diagram of another embodiment of the drive circuit. It shows only an oscillator, and the phase shifter is omitted because it may be identical to that of the previous embodiment. In the present embodiment, blocks $Z_{13}$ to $Z_{16}$ may adopt various impedance circuits so that various modifications may be made.

EXAMPLE 1

Block $Z_{14}$ is the electrostrictive device to be resonated, blocks $Z_{12}$, $Z_{13}$ and $Z_{15}$ are resistors and block $Z_{16}$ is shorted.

EXAMPLE 2

Figures 6A, 6B, 6C:
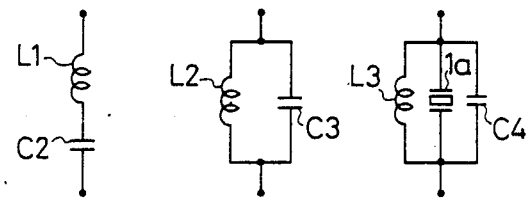

Block $Z_{12}$ is the electrostrictive device to be resonated, block $Z_{16}$ is a series circuit of inductor L1 and capcitor $C_2$ shown in FIG. 6A, where $2\pi fr=1/L1$. $C_2$, and blocks $Z_{13}$, $Z_{14}$ and $Z_{15}$ are resistors. The feedback voltage to the operational amplifier $OP_1$ is maximum at the resonance frequency fr. As the frequency departs from the resonance frequency fr, the impedance of the block $Z_{16}$ increases and the feedback voltage at the input terminal of the operational amplifier $OP_1$ decreases, and hence the amplification factor decreases. As a result, the resonance at the frequency distant from the preset resonance frequency fr is suppressed.

EXAMPLE 3

Block $Z_{12}$ is a parallel circuit of inductor $L_3$, capcitor $C_4$ and electrostrictive device $1a$, where $2fr=1/L_3 \cdot (C_4+Cd)$, Cd is a static capacitance of the electrostrictive device in the resonance state, blocks $Z_{13}$ to $Z_{15}$ are resistors and block $Z_{16}$ is shorted. The impedance of the resonance circuit comprising $L_3$ and $C_4+Cd$ is maximum at the resonance frequency fr and the impedance decreases as the frequency deviates from the resonance frequency fr. Accordingly, the voltage is applied only at the frequency in the vicinity of the resonance frequency fr.

In the present embodiment, the electrostrictive device $1a$ of the devices $1a$ and $1b$ provided for generating the travelling vibration wave is inserted into the bridge circuit of the oscillator so that the oscillation frequency is automatically changed as the impedance of the electrostrictive device changes. In the present embodiment, however, it is difficult to increase the drive voltage because the electrostrictive device $1a$ is directly driven by the output of the oscillator.

Figure 7:
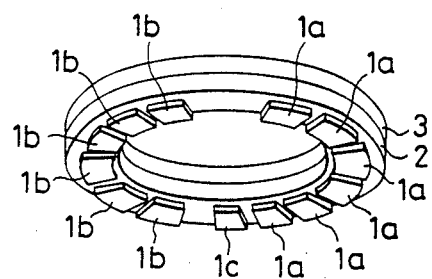
FIG. 7 is a schematic view of major portions of a vibration wave motor to which a second embodiment of the drive circuit of the present invention is applied.
Figure 8A:
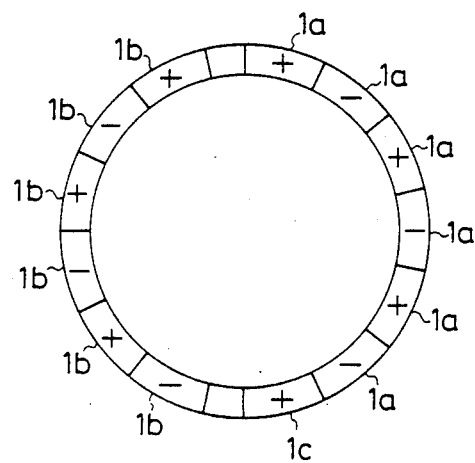
FIG. 8A is a plan view showing an arrangement of electrostrictive devices of the vibration wave motor shown in FIG. 7.
Figure 8B:
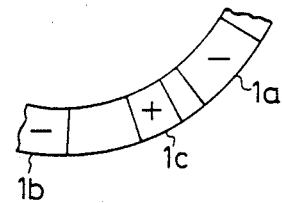
FIG. 8B is a plan view showing another arrangement of electrostrictive devices.
Figure 9:
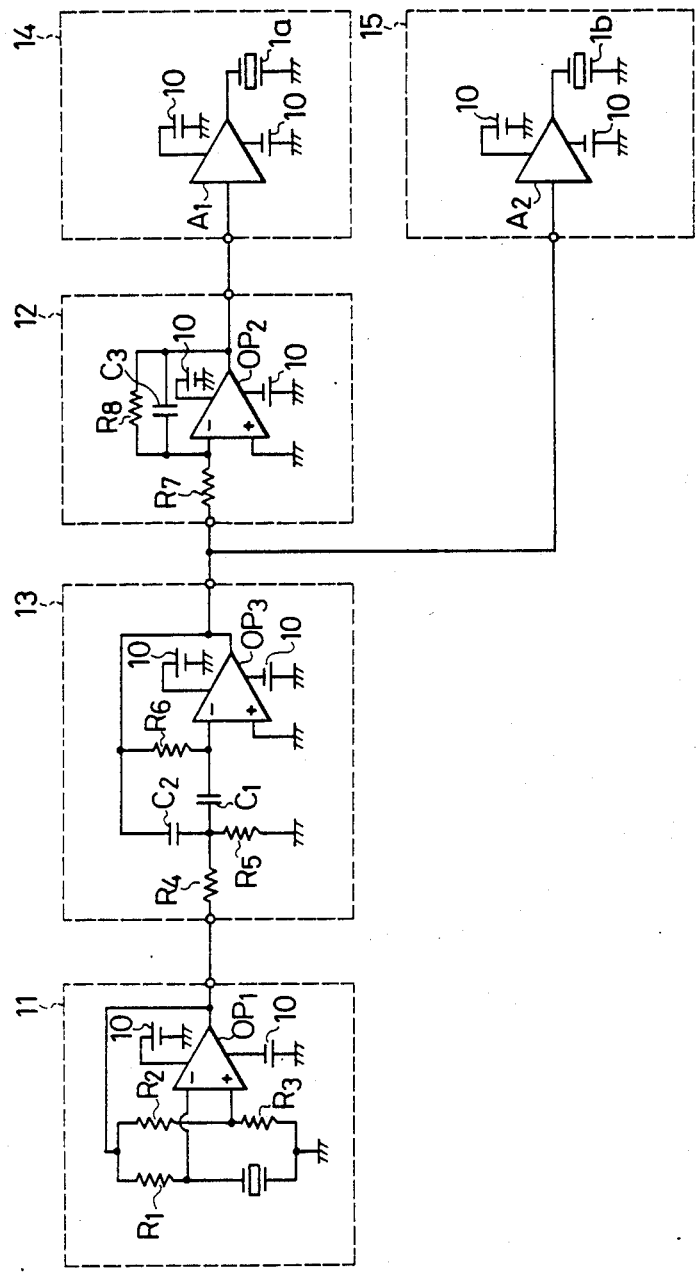
FIG. 9 is a block diagram of the second embodiment of the drive circuit of the present invention.

Referring to FIGS. 7 to 9, another embodiment of the present invention is explained, in which an electrostrictive device $1c$ for detecting the impedance change of the vibration motor is provided separately from the electrostrictive devices $1a$ and $1b$, an oscillator whose oscillation frequency is varied in accordance with a signal derived from the electrostrictive device $1c$ is operated, and the output of the oscillator is amplified and applied to the electrostrictive devices $1a$ and $1b$ so that a large drive power is applied to the electrostrictive devices. FIG. 7 shows an arrangement of the electrostrictive devices and FIG. 8A shows a plan view thereof. The electrostrictive device $1c$ for detecting the impedance change of the vibration wave motor is arranged at a position which vibrates in phase with the electrostrictive devices $1a$. Namely, the electrostrictive device $1c$ is arranged at the same pitch as the electrostrictive devices $1a$ and adjacently to the electrostrictive device $1a$. The electrostrictive device $1c$ need not be arranged adjacently to the electrostrictive device $1a$. FIG. 9 is a circuit block diagram of a drive circuit in the present embodiment. The like elements to those shown in FIG. 3 are designated by the like numerals. Numerals 14 and 15 denote power amplifiers and numeral 13 denotes a band-pass filter which passes only frequencies between $fa(n-1)$ and $fa(n)$ shown in FIG. 10.

In accordance with the present embodiment, since the electrostrictive element $1c$ is provided to detect the impedance change of the vibration wave motor, the output of the oscillator 11 can be amplified by the amplifiers 14 and 15 and the amplified voltages can be applied to the driving electrostrictive devices $1a$ and $1b$. Accordingly, large power can be applied to the electrostrictive devices and the drive power of the vibration wave motor can be increased. The electrostrictive devices $1a$ and $1b$ are driven with 90° phase difference therebetween by the phase shifter.

Figure 10:
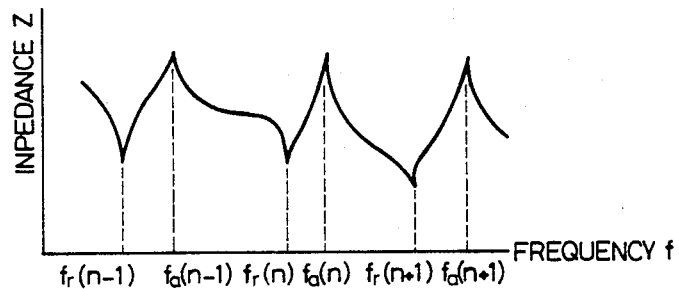
FIG. 10 shows a relation between an impedance of the vibration wave motor and a frequency.

The vibration wave motor of the present embodiment has resonance frequencies $fr(n-1)$, $fr(n)$ and $fr(n+1)$ for $(n-1)$-order resonance mode, n-order resonance mode and $(n+1)$-order resonance mode, respectively. The impedance of the electrostrictive device is low at those resonance frequencies, as shown in FIG. 10.

When the circuit shown in FIG. 3 is used to control the drive frequency so that it is brought to the resonance frequency as the impedance changes due to the resonance of the electrostrictive device. The drive frequency may be brought to $fr(n-1)$ or $fr(n+1)$ in spite of the fact that the highest efficiency vibration mode of the vibration wave motor is the n-order resonance mode due to the structure of the vibration wave motor, and the vibration wave motor may be vibrated in the lower efficiency $(n-1)$-order or $(n+1)$-order resonance mode.

In the present embodiment, because of the provision of the band-pass filter 13, the vibration wave motor resonates only in the highest efficiency n-order resonance mode to generate the travelling surface wave and does not resonate in the low efficiency $(n-1)$-order and $(n+1)$-order resonance modes. Accordingly, a high efficiency drive is attained.

If the travelling vibration wave is generated in the resonance state, the displacement of a point on the electrostrictive device in the direction of wire thickness changes trigonometrically with respect to time, as explained with reference to FIG. 2. The oscillation output may be of rectangular shape due to factors of the circuit configuration (circuit and constants of components). In such a case, the resonance may occur in other than the desired resonance mode. Namely, the resonance in other than the highest efficiency resonance mode may occur by harmonics included in the rectangular oscillation waveform. In accordance with the present embodiment, such a phenomenon is prevented by the provision of the band-pass filter 13.

The oscillation output for driving the electrostrictive devices $1a$ and $1b$ is generated based on the signal generated in the electrostrictive device $1c$. Accordingly, the oscillation output of the oscillator 11 is in phase with the signal from the electrostrictive device $1c$, that is, a vector sum of the voltage difference across the electrostrictive device $1c$ due to the impedance of the electrostrictive device $1c$ created when the voltage is applied to the electrostrictive device $1c$ and a counterelectromotive device $1c$ is displaced by the travelling vibration wave generated by the electrostrictive devices $1a$ and $1b$ when the travelling vibration wave is propagated through the area in which the electrostrictive device $1c$ is arranged.

If the size or the position of the arrangement of the electrostrictive device $1c$ is not specifically related to the arrangement of the electrostrictive device $1a$ or $1b$, it is necessary for generating the travelling vibration wave in the vibration wave motor that the electrostrictive devices $1a$ and $1c$ vibrate in accordance with the positional phase difference. For example, when a portion of the electrostrictive device $1a$ is in a loop of the vibration, the electrostrictive device $1c$ vibrates with a phase difference $\phi$ with respect to the loop of the vibration. In accordance with the drive circuit of the present invention, since, in order to meet the above condition, the electrostrictive devices $1a$ should be driven in phase with the vibration of the area in which the electrostrictive device $1c$ is mounted, if the electrostrictive device $1c$ is positioned without having any positional relationship to those of the electrostrictive devices $1a$ and $1b$, the travelling vibration wave can not be generated. However, the above stated embodiment satisfies the above stated condition since the travelling vibration wave can be generated in the motor.

The mounting position of the electrostrictive device $1c$ is determined such that the vibration in the mounting area of the electrostrictive device $1c$ is in phase with the mounting area of the electrostrictive devices $1a$.

More specifically, as seen from FIG. 8A, the mounting position of the electrostrictive device 1c is determined such that the phase difference between the vibration in the area of the electrostrictive devices 1a and the vibration in the area of the electrostrictive device 1c is substantially zero. Accordingly, in accordance with the present embodiment, the travelling vibration wave is certainly generated.

In the present embodiment, the size of the electrostrictive device 1c is same as that of the electrostrictive devices 1a as shown in FIG. 8A and smaller than that of the electrostrictive devices 1a as shown in FIG. 8B. The size of the electrostrictive device 1c is therefore not limited.

The vibration wave motor is efficiently driven by the friction force generated by the press-contact between the movable member 3 and the vibration member 2. If the pressure changes by any reason such as an article mounted on the movable member 3, the impedance of the electrostrictive device 1c changes and the oscillation frequency of the oscillator 11 changes to other lower efficiency vibration mode. An embodiment which resolves the above problem is explained below.

Figure 11:
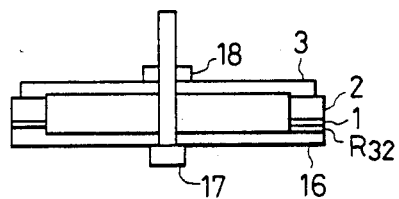
FIG. 11 is a sectional view of a vibration wave motor to which other embodiment of the drive circuit of the present invention is applied.

FIG. 11 shows a sectional view of a vibration wave motor having a strain gauge. The like elements to those shown in FIG. 1 are designated by the like numerals. Numeral 16 denotes a support member for supporting the vibration member 2 and the electrostrictive element 1 and numeral 17 denotes a bolt to which a nut 18 is threaded. By threading the nut 18, the vibration member 2 and the movable member 3 are press-contacted. In order to prevent the rotation of the movable member 3 from being impeded by the nut 18, lubrication oil is applied on the contact surfaces of the nut 18 and the movable member 3 or a bearing is provided. R32 denotes a strain gauge which is mounted between the electrostrictive element 1 and the support member 16. The impedance of the strain gauge increases in proportion to the applied pressure.

The drive circuit for the vibration wave motor having such strain gauge is now explained.

The impedance Z(fr) of the electrostrictive element 1 changes with respect to the applied pressure F between the vibration member 2 and the movable member 3 in the following manner.

$$Z(fr) = Z(fr)F=0 + aF$$

where $Z(fr)F=0$ is the impedance of the electrostrictive element 1 when the pressure $F=0$, and a is a constant (a>0)

Figure 12:
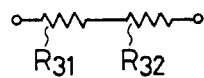
FIG. 12 shows a series circuit of a strain gauge $R_{32}$ and a resistor $R_{31}$ of the vibration wave motor shown in FIG. 11, which is used in place of a resistor $R_3$ shown in FIG. 9.

The Z(fr) changes by approximately several percents although it depends on the change of pressure. As a result, the operating point of the bridge comprising the resistors $R_1$, $R_2$ and $R_3$ of the oscillator 11 and the electrostrictive device 1c may be shifted. In the present embodiment, the strain gauge $R_{32}$ which is a load converter and the resistor $R_{31}$ are connected in series as shown in FIG. 12 and the series circuit is used in place of the resistor $R_3$ of the oscillator 11 shown in FIG. 9.

The impedance of the strain gauge $R_{32}$ is represented by $R_{32}$. Thus, $$R_3 = R_{31} + R_{32} = R_{31}bF$$

where b is a constant, F is the applied pressure.

If the constant b is determined such that $$\frac{R_{31} + bF}{R_2 + R_{31} + bF} - \frac{Z_{F=0} + aF}{R_1 + Z_{F=0} + aF} = \text{constant}$$

then the operating point of the bridge of the oscillator 11 shown in FIG. 4 does not change even if the applied pressure F changes, and the oscillator 11 produces the voltage which can drive the vibration wave motor in the most efficient way irrespectively of the applied pressure F. Although, in the above explanation, we explained the use of the electrostrictive device, it's apparent that a piezoelectric devices can be used, instead of the electrostrictive devices.

What is claimed is:

1. A drive circuit for a vibration wave motor driven by a travelling vibration wave, comprising:
   (a) an electrostrictive device for picking up a vibration of the vibration wave motor and generating an electric signal;
   (b) an oscillation circuit having a resonant circuit including said electrostrictive device, an oscillation frequency thereof which is changed in accordance with said electrical signal representative of the vibration picked up by said electrostrictive device; and
   (c) means for applying a signal representative of the output of said oscillation circuit to said vibration wave motor.

2. A drive circuit for a vibration wave motor according to claim 1 wherein said oscillation circuit automatically changes said oscillation frequency such that the vibration picked up by said electrostrictive device resonates.

3. A drive circuit for a vibration wave motor driven by a travelling vibration wave, comprising:
   (a) an electrostrictive device for picking up a vibration of said vibration wave motor and generating an electric signal;
   (b) a Meacham circuit having an oscillation frequency thereof changed in accordance with said electrical signal representative of said vibration picked up by said electrostrictive device, and
   (c) means for applying the oscillation output of said Meacham circuit to said vibration wave motor, said Meacham circuit including an operational amplifier having an inverting input terminal and a non-inverting input terminal and a bridge circuit connected between said inverting input terminal and said non-inverting input terminal, said bridge circuit having three sides thereof each having a resistor and one side thereof connected to said electrostrictive device, and said electrostrictive device being connected between ground and said inverting input terminal of said operational amplifier.

4. A drive circuit for a vibration wave motor driven by a travelling vibration wave, comprising:
   (a) an electrostrictive device for picking up a vibration of said vibration wave motor and generating an electrical signal;
   (b) an oscillation circuit having an oscillation output frequency thereof which is changed in accordance with the electrical signal representative of said vibration picked up by said electrostrictive device,
   (c) a filter circuit for allowing a predetermined frequency band to pass therethrough, said predetermined frequency band including a predetermined resonant frequency present in an output of said oscillation circuit, and said predetermined resonant frequency being used for generating a travelling vibration wave; and (d) means for applying the oscillation output of said oscillation circuit, which passes through said filter circuit, to said vibration wave motor.

5. A drive circuit for a vibration wave motor according to claim 4 wherein said oscillation circuit is a meacham circuit.

6. A drive circuit according to claim 1, wherein a said electrostrictive device is a piezoelectric device.

7. A drive circuit according to claim 3, wherein said electrostrictive device is a piezoelectric device.

8. A circuit according to claim 4, wherein said electrostrictive device is a piezoelectric device.

9. A drive circuit for a vibration wave motor driven by a travelling vibration wave, comprising:

(a) an electrostrictive device for picking up a vibration of said vibration wave motor, said device having an impedance relating to the vibration picked up;

(b) an oscillation circuit having a resonant circuit including said electrostrictive device; and (c) means for applying a signal representative of the output of said oscillation circuit to said vibration wave motor, said oscillation circuit oscillating at a frequency relating to the impedance of said electrostrictive device and said oscillation circuit being controlled so as to decrease the change of impedance by the vibration of the vibration wave motor at a resonant frequency of said resonant circuit.

10. A drive circuit for a vibration wave motor driven by a travelling vibration wave, comprising:

means for applying a periodic signal to a vibration element to generate a travelling vibration wave so that the motor is driven by the travelling vibration wave; and means for detecting the vibration state of the motor so that the frequency of the periodic signal may be controlled;

wherein said vibration element is used as said means for detecting and said frequency of the periodic signal is controlled on the basis of an output generated by the vibration detected in said vibration element.

11. An apparatus comprising:

(a) a movable member adapted for mounting on a vibration member;

(b) said vibration member having said vibration element mounted thereon for driving said movable member by a travelling vibration wave;

(c) vibration detection means for detecting vibration caused by said travelling vibration wave;

(d) contact detection means for detecting if there is contact between said vibration member and said movable member; and (e) means for generating a frequency signal for generating the travelling vibration wave in said vibration member in response to the output of said vibration detection means and the output of said contact detection means and applying said frequency signal to said vibration element.

12. An apparatus comprising:

(a) a movable member adapted for mounting on a vibration member;

(b) said vibration member having a vibration element mounted thereon for driving said movable member by a travelling vibration wave;

(c) vibration detection means mounted at a predetermined position of said vibration member, said vibration element at said predetermined position vibrating with either the same or reversed phase with respect to that of said vibration member, wherein said vibration detection means is an electrostrictive device mounted on said vibration element and is arranged at the same pitch as said vibration element so that said electrostrictive device vibrates either in phase with or out of phase with said vibration element; and (d) means for generating a frequency signal in said vibration member in response to the output of said vibration detection means and applying said frequency signal to said vibration element.

* * * * *

UNITED STATES PATENT AND TRADEMARK OFFICE
CERTIFICATE OF CORRECTION

PATENT NO. : 4,658,172

DATED : April 14, 1987

INVENTOR(S) KAZUHIRO IZUKAWA

It is certified that error appears in the above-identified patent and that said Letters Patent is hereby corrected as shown below:

[30] FOREIGN APPLICATION PRIORITY DATA

Insert --Dec. 28, 1984 [JP]   Japan..... 59-276962--.

IN THE DRAWINGS

Sheet 2 of 5
        Fig. 4, "INPENDANCE" should read
            --IMPEDANCE--.

Sheet 5 of 5
        Fig. 10, "INPENDANCE" should read
            --IMPEDANCE--.

COLUMN 1

Line 53, "electroctrictive" should read
        --electrostrictive--.
    Line 61, "quiscent" should read --quiescent--.

COLUMN 2

Line 34, "drives" should read --drive--.
    Line 57, "OR" should read --OF--.

COLUMN 3

Line 4, "effeciency" should read --efficiency--.
    Line 35, "other" should read --another--.
    Line 58, "with" should read --in--.
    Line 63, "(1)" should be moved to the right-hand
        margin of column 3.

UNITED STATES PATENT AND TRADEMARK OFFICE
CERTIFICATE OF CORRECTION

PATENT NO. : 4,658,172

DATED : April 14, 1987

INVENTOR(S) : KAZUHIRO IZUKAWA

It is certified that error appears in the above-identified patent and that said Letters Patent is hereby corrected as shown below:

COLUMN 4

Lines 13-14, " $\dfrac{R_1}{(z + R_1)} 2$ " should read -- $\dfrac{R_1}{(z + R_1)^2}$ --

Line 38, "integraton" should read --integration--.

COLUMN 5

Line 3, "capcitor" should read --capacitor--.
Line 67, delete "so that"; and after "frequency" insert --of the vibration wave motor,--.

COLUMN 7

Line 10, "is same" should read --is the same--.
Line 18, "by" should read --for--.
Line 54, "percents" should read --percent--.
Line 66, "$R_{31}bF$" should read --$R_{31} + bF$--.

UNITED STATES PATENT AND TRADEMARK OFFICE
CERTIFICATE OF CORRECTION

PATENT NO. : 4,658,172
DATED : April 14, 1987
INVENTOR(S) : Kazuhiro Izukawa

It is certified that error appears in the above-identified patent and that said Letters Patent is hereby corrected as shown below:

COLUMN 8

Line 13, "that a" should read -- that --.

Signed and Sealed this

Eighteenth Day of August, 1987

Attest:

DONALD J. QUIGG

Attesting Officer   Commissioner of Patents and Trademarks